(12) United States Patent
Shimizu

(10) Patent No.: US 7,486,453 B2
(45) Date of Patent: Feb. 3, 2009

(54) LENS BODY TUBE AND PROJECTOR HAVING THE SAME

(75) Inventor: Hitoshi Shimizu, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 12/112,515

(22) Filed: Apr. 30, 2008

(65) Prior Publication Data

US 2008/0273252 A1 Nov. 6, 2008

(51) Int. Cl.
*G02B 7/02* (2006.01)
(52) U.S. Cl. .................. 359/819; 359/822; 359/823
(58) Field of Classification Search ............. 359/811, 359/813, 814, 819, 821, 822, 823, 826
See application file for complete search history.

(56) References Cited

U.S. PATENT DOCUMENTS

2005/0018319 A1* 1/2005 Yano .................. 359/819

FOREIGN PATENT DOCUMENTS

JP 2003-66316 A 3/2003

* cited by examiner

*Primary Examiner*—Timothy J Thompson
(74) *Attorney, Agent, or Firm*—Birch, Stewart, Kolasch & Birch, LLP

(57) ABSTRACT

A lens body tube comprising: a projection lens; a rotary cam tube that moves a variable power lens within the projection lens in an optical axis direction in accordance with a rotation of the rotary cam tube; a supporting tube, provided at an outside of the rotary cam tube, that rotatably supports the rotary cam tube; a zooming tube, rotatably provided at an outside of the supporting tube, that rotatably supports the supporting tube and rotates the rotary cam tube in accordance with a rotation of the zooming tube; a cam gear provided at an outer peripheral surface of the rotary cam tube; a zoom gear provided at an inner peripheral surface of the zooming tube; a relay gear that is rotatably provided between the rotary cam tube and the zooming tube, and meshes with the cam gear and the zoom gear to transmit a rotation movement of the zooming tube to the rotary cam tube; an insertion hole which is formed at the supporting tube and in which the relay gear is inserted; and a supporting portion, provided at the supporting tube, that rotatably supports the relay gear.

4 Claims, 9 Drawing Sheets

LENS BODY TUBE AND PROJECTOR HAVING THE SAME

BACKGROUND OF THE INVENTION

1. Field of the Invention

The present invention relates to a lens body tube which images an image light by a projection lens to thereby project an image on a screen and also relates to a projector having the lens body tube.

2. Description of the Related Art

A projector is provided with a lens body tube having a lens and a rotary cam tube for moving the lens in an optical axis direction. A lens frame of a ring or cylindrical shape is fixed to the lens (see a JP-A-2003-66316, for example). The lens frame is attached within the rotary cam tube so as to be movable freely. An elongated cam hole is formed at the outer periphery of the rotary cam tube. A lens roller to be inserted into the cam hole is attached to the outer periphery of the lens frame. A supporting tube for rotatably supporting the rotary cam tube is disposed within the rotary cam tube. A flange portion protruded radially is formed at the rear end portion of the supporting tube. The flange portion is fixed to a fixing member within the projector. The lens roller is inserted into the cam hole via an insertion hole formed at the supporting tube. When the rotary cam tube is rotated, the lens frame moves in the optical axis direction to thereby perform the zooming of a projection image.

The cam hole is formed at the rotary cam tube by the cutting process since the size management thereof is required strictly. On the other hand, the supporting tube is formed by the injection molding of resin so as to reduce the cost thereof.

In recent years, a projector arranged to have a large movable length of the lens frame has been proposed in order to increase a zoom value. In order to increase the movable length of the lens frame, it is necessary to also increase the length of each of the rotary cam tube and the supporting tube.

However, since the supporting tube is fixed to the fixing member at the flange portion of the rear end portion, when the length of each of the supporting tube becomes long, there arise a problem that the stability of the supporting tube degrades when being fixed. Thus, it is considered to dispose the supporting tube on the outside of the rotary cam tube and form the flange portion on the front side than the rear end portion of the supporting tube. In this case, a lever protruding in the outer periphery direction is attached to the rotary cam tube and a lever insertion hole for passing the lever therethrough is formed at the supporting tube, whereby when the lever is rotated from the outside of the supporting tube, the rotary cam tube rotates to perform the zooming operation.

However, in this case since the lever insertion hole is required to be formed to have a length within a rotary operation range (rotary angle range of the rotary cam tube) of the lever at the time of zooming, there arises problem that the intensity of the supporting tube degrades. Further, since the supporting tube is formed by the injection molding of resin, there arises a problem that the resin does not flow smoothly at the periphery of the lever insertion hole and the forming stability degrades and so the size thereof can not be managed strictly.

SUMMARY OF THE INVENTION

The invention is made in order to solve the aforesaid problems and an object of the invention is to provide a lens body tube and a projector having the lens body tube which can maintain the intensity and the size accuracy of a supporting tube despite that the supporting tube is disposed at the outside of a rotary cam tube.

In order to solve the aforesaid problem, according to the invention, there is provided a lens body tube comprising: a projection lens; and a rotary cam tube that moves a variable power lens within the projection lens in an optical axis direction in accordance with a rotation of the rotary cam tube, so as to perform a zooming operation in response to movement of the variable power lens in the optical axis direction, the lens body tube further comprising: a supporting tube, provided at an outside of the rotary cam tube, that rotatably supports the rotary cam tube; a zooming tube, rotatably provided at an outside of the supporting tube, that rotatably supports the supporting tube and rotates the rotary cam tube in accordance with a rotation of the zooming tube; a cam gear provided at an outer peripheral surface of the rotary cam tube; a zoom gear provided at an inner peripheral surface of the zooming tube; a relay gear that is rotatably provided between the rotary cam tube and the zooming tube, and meshes with the cam gear and the zoom gear to transmit a rotation movement of the zooming tube to the rotary cam tube; an insertion hole in which the relay gear is inserted so as to mesh the relay gear with the cam gear and the zoom gear, the insertion hole being formed at the supporting tube and; and a supporting portions provided at the supporting tube, that rotatably supports the relay gear.

Preferably, the relay gear has a rotary shaft acting as a rotation center, and the supporting portion is configured by a bearing recess portion which is formed so as to continue to the insertion hole and in which the rotary shaft is inserted. Further, preferably, the supporting tube is formed by injection molding of resin.

Further, the projector according to the invention is characterized by including the lens tube body.

DETAILED DESCRIPTION OF THE INVENTION

Figure 1:
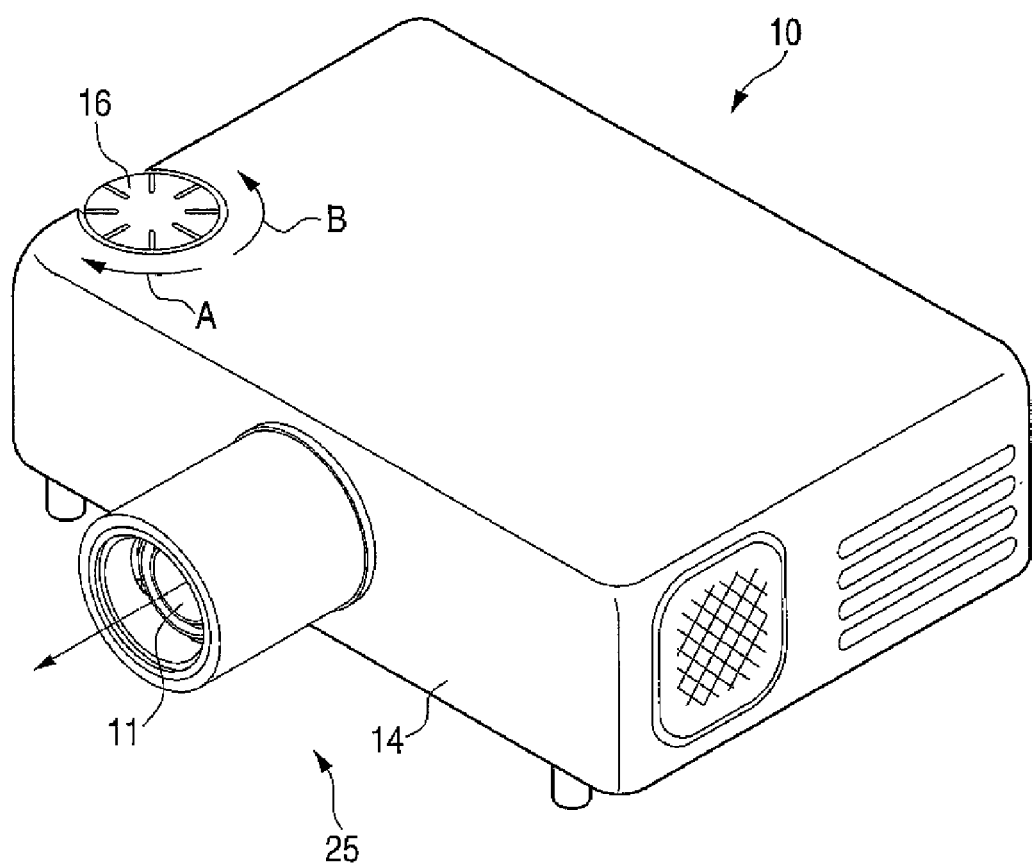
FIG. 1 is an external view showing a projector.
Figure 2:
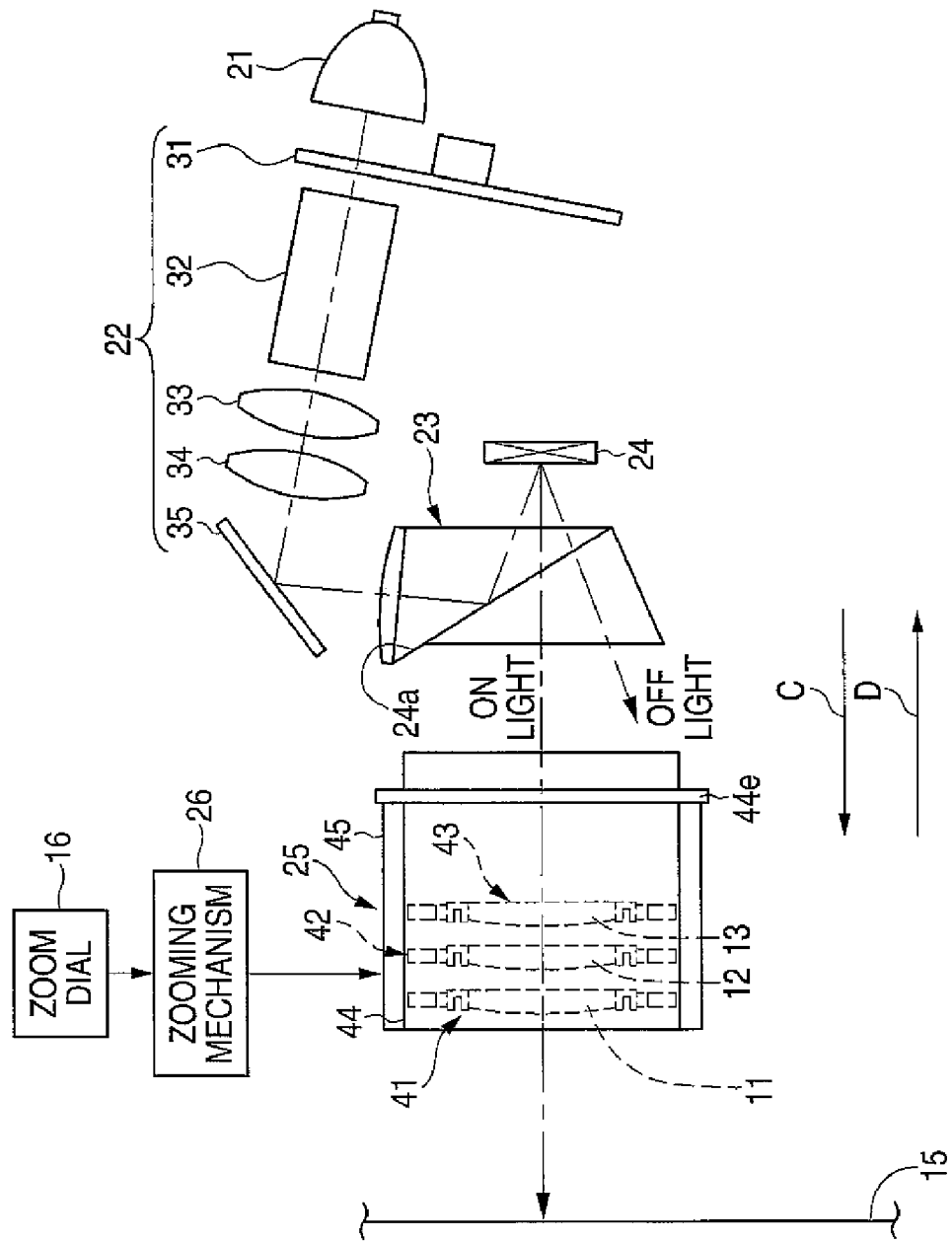
FIG. 2 is an explanatory diagram showing the schematic configuration of the projector.

As shown in FIGS. 1 and 2, a projector 10 according to the invention is arranged in a manner that when a lens cover is opened at the time of using, a first projection lens 11 is exposed on the front face of a casing 14. A second projection lens 12 and a third projection lens 13 are disposed in the rear direction of the first projection lens 11. A screen 15 is disposed in the front direction of the first projection lens 11 so that an image is projected from the first projection lens 11 on the screen. A zoom dial 16 of a rotary type is provided on the upper surface of the casing 14 so that the zooming operation of a projection image (an image projected on the screen 15a) using the first to third projection lenses 11 to 13 can be performed by operating (rotating) the zoom dial 16. A projection image can be zoomed by rotating the zoom dial 16 in an A direction or a B direction in FIG. 1.

The casing 14 is provided therein with a light source 21, an illumination optical system 22, a prism 23, a DMD 24, a lens tube 25 as a projection optical system and a zooming mechanism 26 etc. A white light source such as a xenon lamp or a mercury lamp is used as the light source 21. An illumination light emitted from the light source 21 is incident into the illumination optical system 22.

The illumination optical system 22 is configured by a color wheel 31, a rod integrator 32, relay lenses 33, 34 and a mirror 35. The color wheel 31 separates the light from the light source 21 into G, B and R in a time divisional manner. The color wheel 31 is configured in a manner that a B filter for transmitting only a blue (B) light, a G filter for transmitting only a green (G) light and a R filter for transmitting only a red (R) light are disposed on a disc of an almost circular plate shape so that the respective filters locate at almost the same distance from the rotation center of the disc. The color wheel 31 rotates at a high speed to sequentially locate the filters of the respective colors at an illumination light path, whereby the illumination light is separated into B, G and R in the time divisional manner and the light rays of the respective colors thus separated are irradiated toward the DMD 24 sequentially.

The rod integrator 32 is formed by glass, for example, and a reflection surface is formed at the inside thereof. The light rays separated by the color wheel 31 are uniformed while repeatedly reflecting when passing through the rod integrator 32. The relay lenses 33, 34 relay a light flux emitted from the rod integrator 32 to the mirror 35. The mirror 35 reflects the light flux toward the prism 23.

The prism 23 acts to separate the light flux being incident into the DMD 24 from the mirror 35 from a reflection light reflected by the DMD 24. The prism 23 is formed by two triangular prisms having the same refraction indexes, for example, and a reflection surface 24a is formed between the boundary of these two triangular prisms. The incident light is totally reflected by the reflection surface 24a and enters into the DMD 24 since the incident angle is larger than the critical angle as to the incident light. On the other hand, the reflection light reflected by the DMD 24 transmits the reflection surface 24a since the incident angle is smaller than the critical angle as to the reflection light.

As is well known, the DMD 24 is configured in a manner that many mirror elements corresponding to pixels are arranged in a matrix manner on a light receiving surface. Each of the mirror elements changes its angle in accordance with an image to be projected to thereby change the reflection direction of the received illumination light. In the case of displaying the pixel as a bright pixel, the mirror element is displaced to an ON position to thereby reflect the received light toward the lens tube 25 as an ON light. On the other hand, in the case of displaying the pixel as a dark pixel, the mirror element is displaced to an OFF position to thereby reflect the received light toward the direction deviated from the lens tube 25 as an OFF light. The image light is configured by the aggregation of ON lights directed to the lens tube 25.

Figure 3:
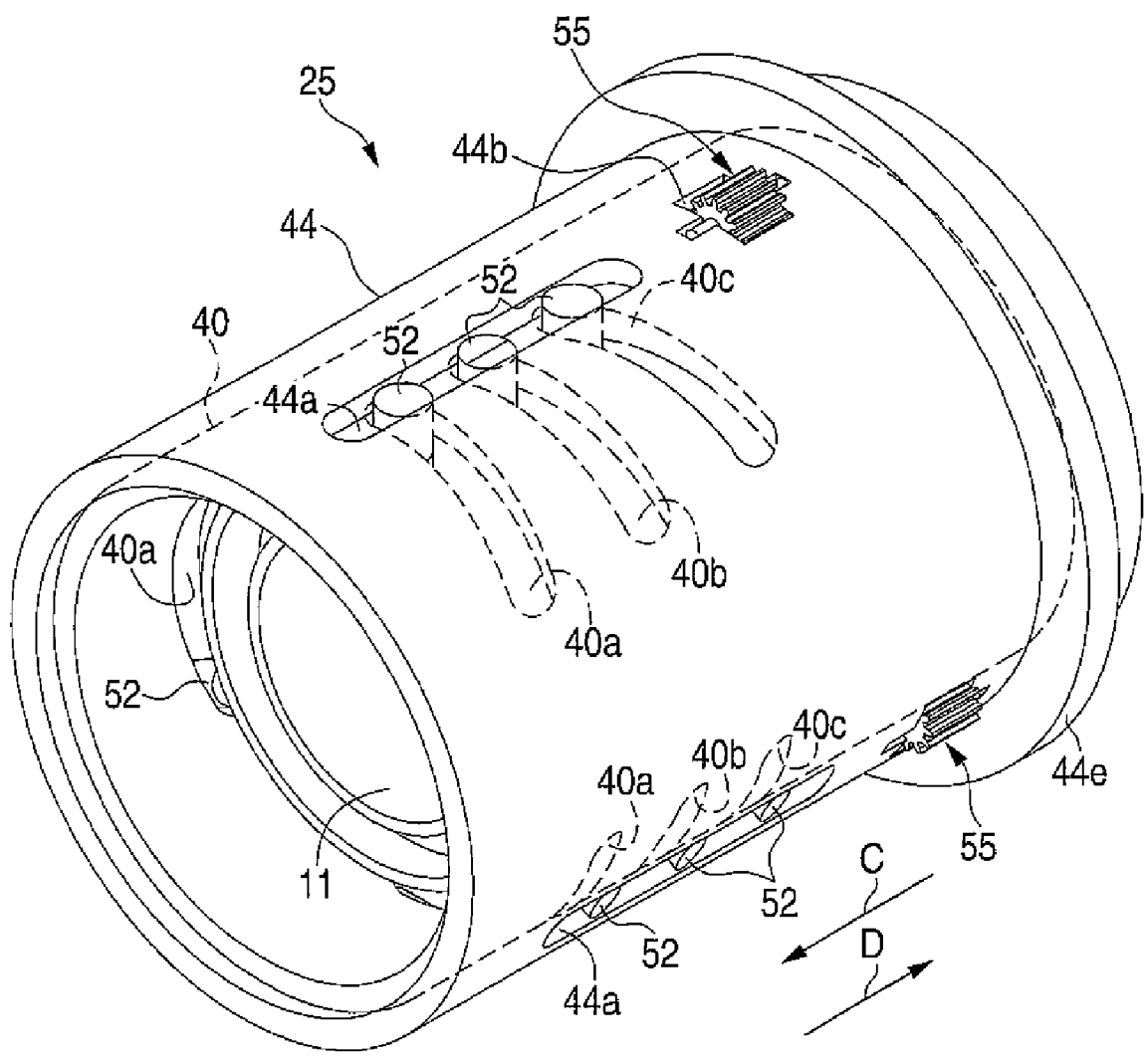
FIG. 3 is a perspective view showing a projection optical system.
Figure 4:
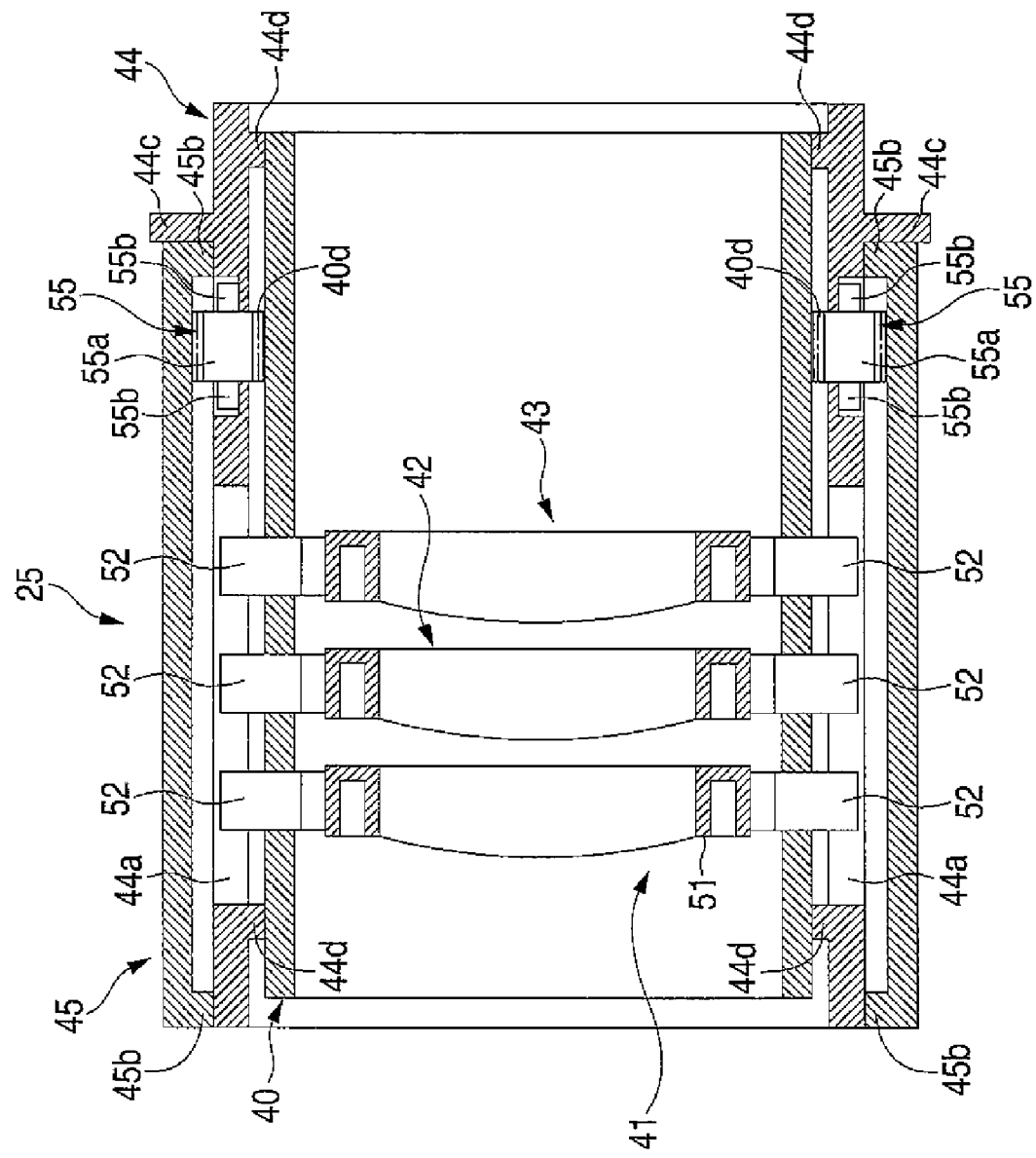
FIG. 4 is a sectional diagram showing the side surface of the projection optical system.

As shown in FIGS. 2 to 4, the lens tube 25 includes a rotary cam tube 40, a first lens unit 41 having the first projection lens 11, a second lens unit 42 having the second projection lens 12, a third lens unit 43 having the third projection lens 13, a mechanism 44 and a zooming tube 45. The first to third lens units 41 to 43 are disposed within the rotary cam tube 40. As described in detail later, each of the first to third lens units 41 to 43 is provided so as to be movable in C and D directions in FIGS. 2 and 3. The image light generated by the DMD 24 is imaged on the screen 15 by the lens tube 25, whereby an image is projected on the screen 15. The number of the projection lenses constituting the lens tube 25 is not limited to three and may be changed suitably.

The zooming mechanism 26 is arranged in a manner that a projection image (an image to be projected on the screen 15) is zoomed by rotating the rotary cam tube 40 to thereby move the first to third projection lenses 11 to 13. The rotary cam tube 40 is rotated to thereby move the first to third projection lenses 11 to 13 so that a projection image is zoomed in accordance with the rotation angle (operation amount) of the zoom dial 16 of the rotary type. In this embodiment, the first to third projection lenses 11 to 13 also act as a variable power lens.

Figure 5:
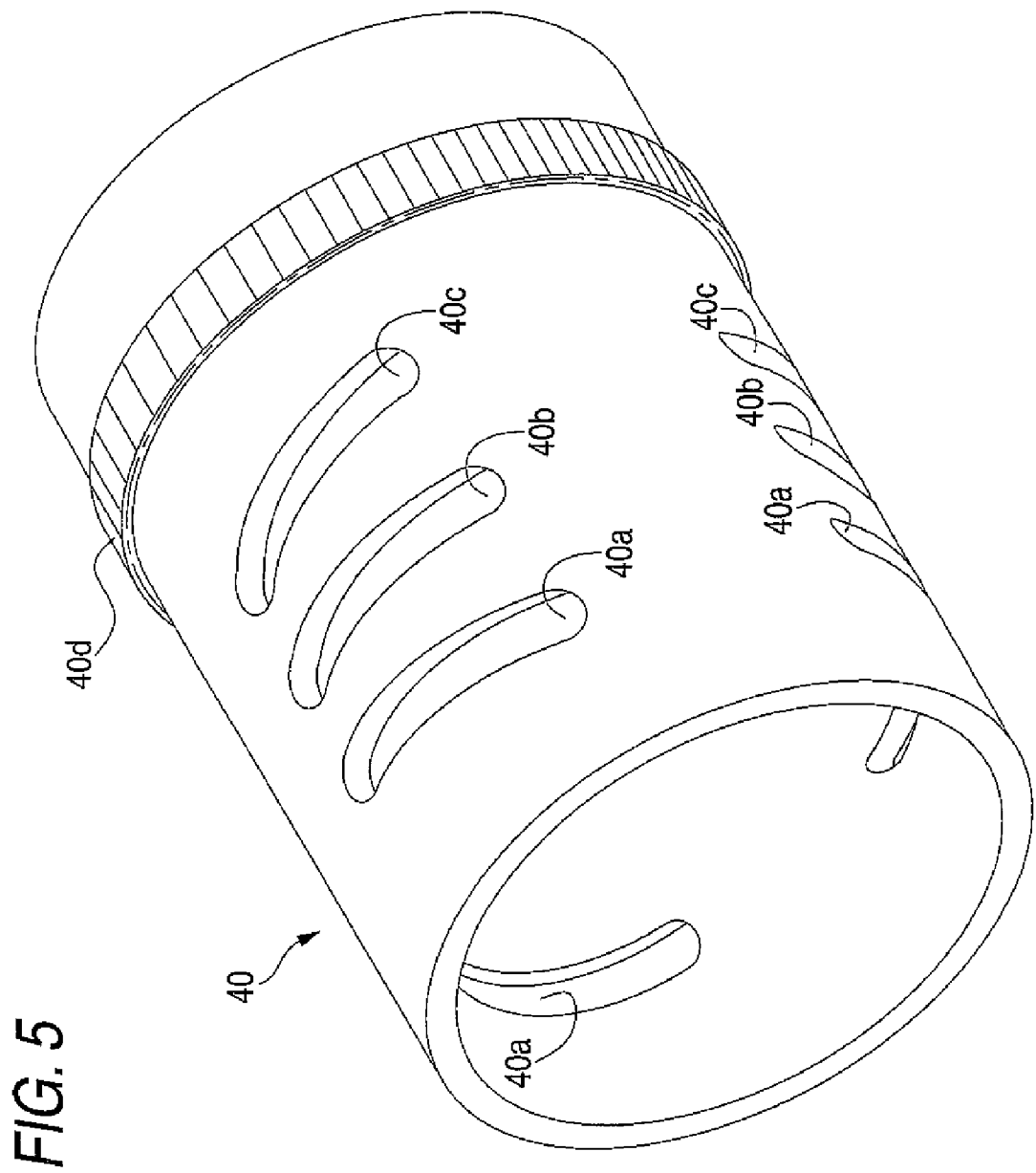
FIG. 5 is a perspective view showing a rotary cam tube.

As shown in FIGS. 3 to 5, first to third cam holes 40a to 40c each having an elongated shape, into which the zoom rollers 52 of the first to third lens units 41 to 43 are respectively inserted, are formed on the outer peripheral surface of the rotary cam tube 40. Each of the first to third cam holes 40a to 40c is provided three so as to have an interval of 120 degree along the circumferential direction thereof. The first to third cam holes 40a to 40c are arranged in a manner that when the rotary cam tube 40 is rotated clockwise, the first lens unit 41 moves backward (the direction D in FIG. 3), the second lens unit 42 moves backward and the third lens unit 43 moves in the forward direction (the direction C in FIG. 3), whilst when the rotary cam tube 40 is rotated counterclockwise, the first lens unit 41 moves in the forward direction, the second lens unit 42 moves in the forward direction and the third lens unit 43 moves backward.

Figure 6:
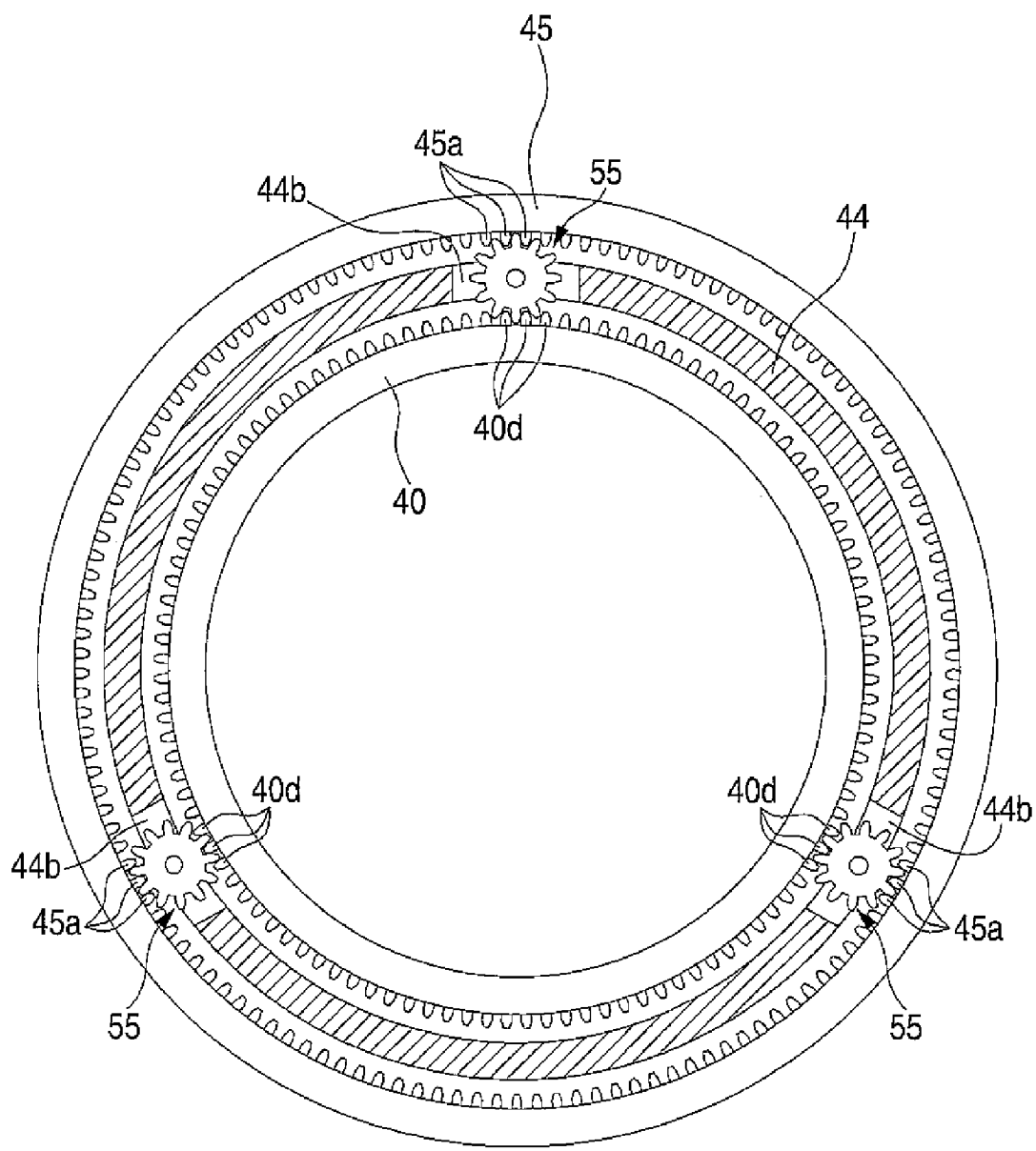
FIG. 6 is a front view showing the rotary cam tube, a supporting tube, a zooming tube and relay gears.

As shown in FIGS. 5 and 6, a cam gear 40d to be meshed with relay gears 55 described later is formed on the outer peripheral surface of the rear end portion side of the rotary cam tube 40 along the entire circumference thereof.

Figure 7:
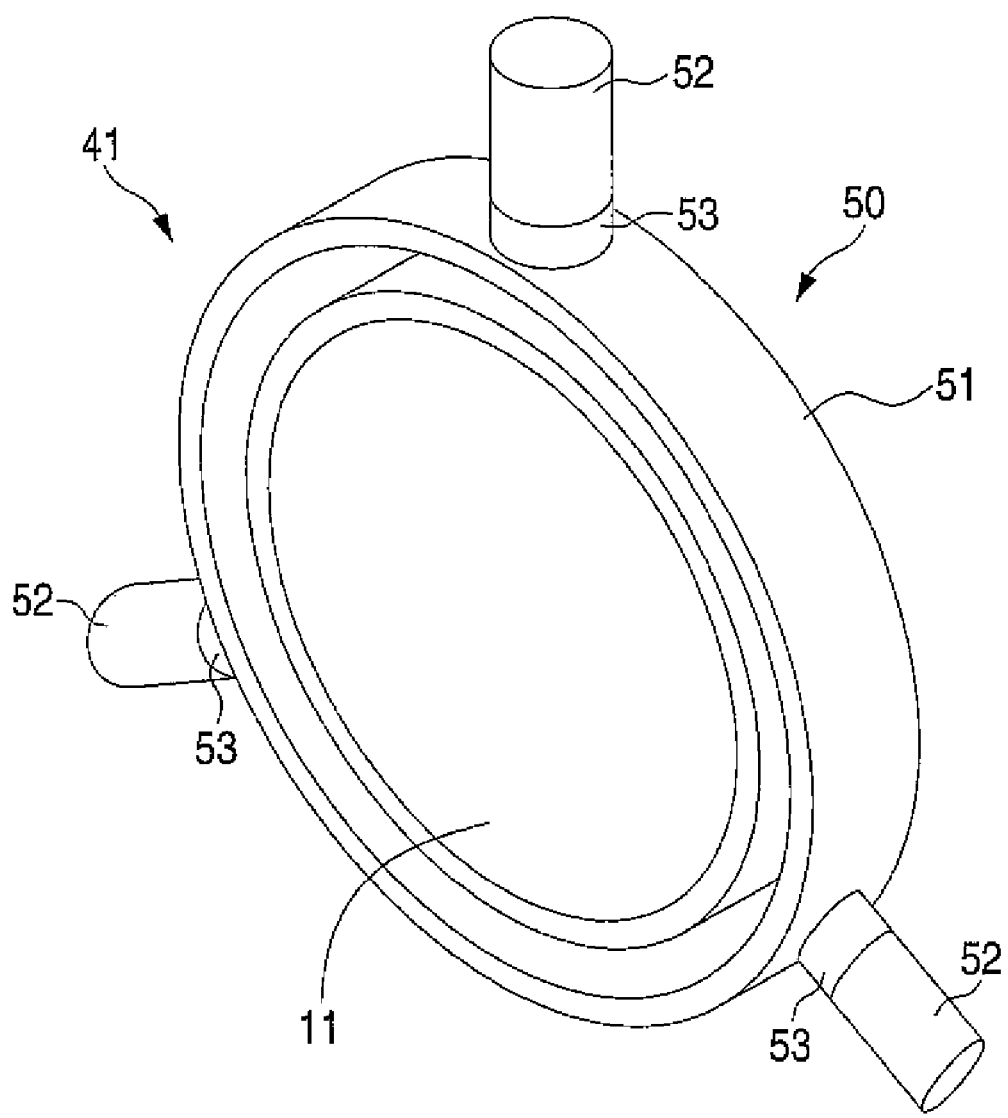
FIG. 7 is a perspective view showing a first lens unit.

As shown in FIG. 7, the first lens unit 41 includes the first projection lens 11 and a lens holder 50. The lens holder 50 includes a holder main body 51 fixed to the first projection lens 11, the zoom rollers 52 each formed by polyacetal to be engaged with the first cam hole 40a formed at the rotary cam tube 40, and roller supporting portions 53 for detachably and rotatably supporting the zoom rollers 52, respectively. The three roller supporting portions 53 are attached to the outer peripheral surface of the holder main body 51 with an interval of 120 degree along the circumferential direction thereof. Each of the roller supporting portions 53 supports the corresponding one of the zoom rollers 52 so as to be rotatable. The first projection lens 11 and the lens holder 50 are formed in a manner that when the lens holder 50 is fixed to the first projection lens 11, the length from the center of the first projection lens 11 to the outer peripheral surface of the roller supporting portion 53 is slightly shorter than the radius of the inner periphery of the rotary cam tube 40. Thus, the first lens unit 41 can be inserted within the rotary cam tube 40 in a state where the zoom rollers 52 are removed from the lens holder 50.

The zoom rollers 52 are formed to protrude from the outer peripheral surface of the rotary cam tube 40 when the first lens unit 41 is assembled to the rotary cam tube 40. The zoom rollers 52 respectively attached to the roller supporting portions 53 and protruded from the outer peripheral surface of the rotary cam tube 40 are inserted into guide holes 44a (see FIGS. 3 and 4) as a linear traveling guide formed at the supporting tube 44, respectively. Each of the guide holes 44a is formed linearly in the optical axis direction of a projection light, whereby the first to third lens units 41 to 43 move in the optical axis direction of a projection light when the rotary cam tube 40 is rotated.

In the similar manner as the first lens unit 41, the second lens unit 42 includes the second projection lens 12 and the lens holder 50 and also the third lens unit 43 includes the third projection lens 13 and the lens holder 50.

Figure 8:
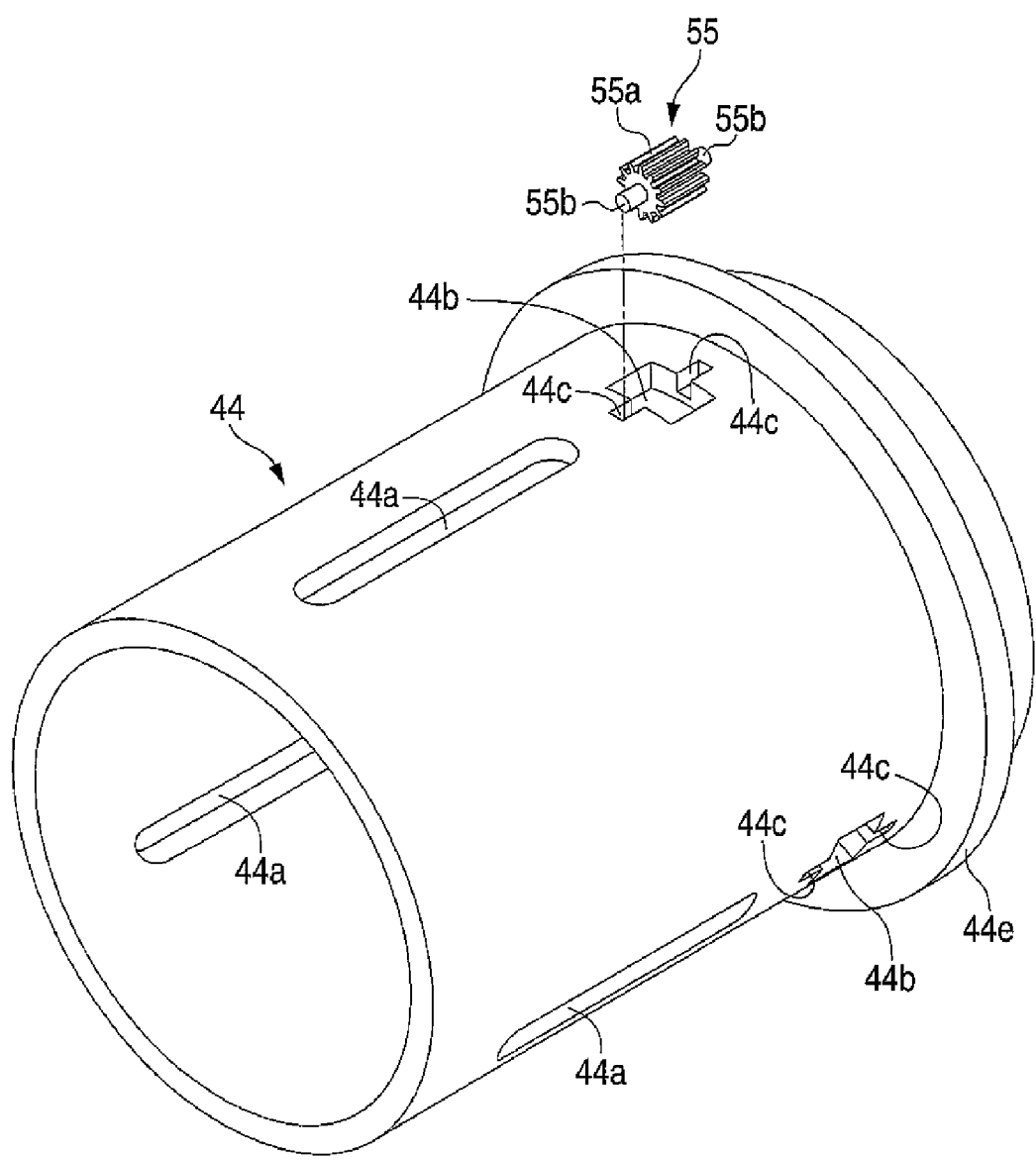
FIG. 8 is a perspective view showing the supporting tube.

As shown in FIGS. 4, 6 and 8, the supporting tube 44 rotatably supports the rotary cam tube 40 and is formed by the injection molding of resin. The supporting tube 44 is provided with the guide holes 44a serving as the linear traveling guide for the zoom rollers 52 and insertion holes 44b for inserting the main body portions 55a of the relay gears 55 therein, respectively. Each of the insertion holes 44b is formed linearly in the optical axis direction of a projection light. Each of the guide holes 44a and the insertion holes 44b are provided three so as to have an interval of 120 degree along the circumferential direction of the supporting tube. Bearing recess portions (supporting portions) 44c in which the shaft 55b of the relay gear 55 is inserted are formed at the front and rear portions of the insertion hole 44b.

The relay gear 55 is arranged in a manner that the two shafts 55b are erected from the main body portions 55a having gear teeth on the outer peripheral surface thereof. When the shafts 55b are inserted into the bearing recess portions 44c respectively, the relay gear 55 meshes with the cam gear 40d of the rotary cam tube 40 and is rotatably supported by the bearing recess portions 44c around the shafts 55b.

Supporting convex portions 44d for rotatably supporting the rotary cam tube 40 are formed on the inner peripheral surface of the supporting tube 44 along the entire circumference thereof. The two supporting convex portions 44d are formed at the front side end portion and the rear side end portion of the supporting tube 44, respectively, whereby the rotary cam tube 40 is rotatably supported by the supporting tube 44 without being rattling.

A flange portion 44e is formed at the outer peripheral surface of the supporting tube 44 on the front side than the rear end portion. The flange portion 44e is fixed by a fixing member provided within the projector 10.

Figure 9:
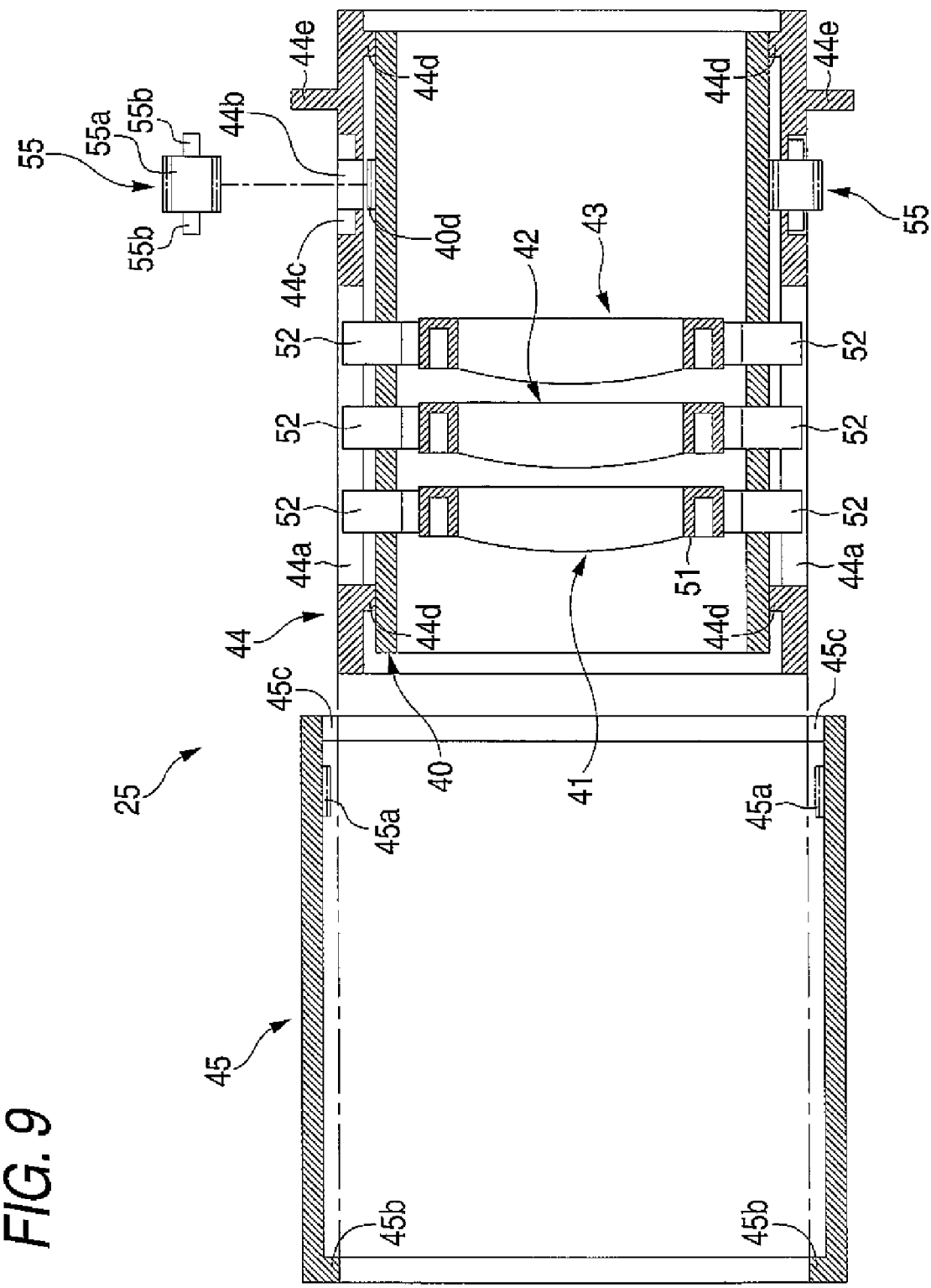
FIG. 9 is a sectional diagram showing the broken side surface of the projection optical system.

As shown in FIGS. 6 and 9, the zooming tube 45 rotatably supports the supporting tube 44 and is formed in a cylindrical shape. A zoom gear 45a to be meshed with the relay gears 55 is formed at the rear end portion an the inner peripheral surface of the zooming tube 45 along the entire circumference thereof. Supporting convex portions 45b for rotatably supporting the supporting tube 44 are formed on the inner peripheral surface of the zooming tube 45 along the entire circumference thereof. The two supporting convex portions 45b are formed at the front side end portion and the rear side end portion of the zooming tube 45, respectively, whereby the supporting tube 44 is rotatably supported by the zooming tube 45 without being rattling. The zooming mechanism 26 is arranged to rotate the rotary cam tube 40 via the relay gears 55 by rotating the zooming tube 45. In FIG. 6, only the 44 is shown as a sectional diagram and each of the rotary cam tube 40, the zooming tube 45 and the relay gears 55 is shown as a front view.

A mode for assembling the lens tube 25 will be explained. After inserting the first lens unit 41 into the rotary cam tube 40 in a state where the zoom rollers 52 are removed from the lens holder 50, the rotary cam tube 40 is inserted into the supporting tube 44. Then, the root side of each of the zoom rollers 52 is inserted into the guide hole 44a of the supporting tube 44 and the first cam hole 40a, whereby each of the zoom rollers is attached to the roller supporting portion 53. The operation of assembling each of the second lens unit 42 and the third lens unit 43 to the rotary cam tube 40 is performed in the similar manner. A cover tube (not shown) covering the zooming tube 45 is attached to the outer side of the zooming tube 45 so that a user can not touch the zooming tube 45.

Next, the main body portion 55a of the relay gear 55 is inserted into the insertion hole 44b of the supporting tube 44 to thereby insert the shafts 55b into the bearing recess portions 44c, respectively, whereby the relay gear 55 meshes with the cam gear 40d of the rotary cam tube 40 and is rotatable around the shafts 55b.

Then, as shown in FIG. 9, the zooming tube 45 is assembled to the front side (left side in FIG. 9) of the supporting tube 44. In order to assemble the zooming tube 45 after assembling all the relay gears 55, the supporting convex portion 45b formed at the rear side end portion of the zooming tube 45 is provided with three notches 45c respectively corresponding to the three relay gears 55 so that the zooming tube does not contact with the relay gears. When the zooming tube 45 is assembled, the zoom gear 45a mesh with the relay gears 55 (see FIG. 6). Thus, when the zooming tube 45 rotates, the rotary cam tube 40 rotates via the relay gears 55.

When a user rotates (operates) the zoom dial 16, the zooming mechanism 26 operates to rotate the zooming tube 45, whereby the rotary cam tube 40 is rotated via the relay gears 55 in accordance with the rotation of the zooming tube 45. When the rotary cam tube 40 rotates, the first to third projection lenses 11 to 13 move to thereby perform the zooming operation of a projection image (an image to be projected on the screen 15).

In this manner, since the zooming operation is performed by rotating the rotary cam tube 40 via the relay gears 55 in accordance with the rotation of the zooming tube 45, the size of each of the insertion holes 44b formed at the supporting tube 44 as holes for the zooming operation can be made smaller as compared with the case where the rotary cam tube 40 is rotated by a lever. Thus, the intensity of the supporting tube 44 can be maintained despite that the zooming tube 45 is disposed at the outside of the rotary cam tube 40. Further, the molding stability and the size accuracy of the supporting tube 44 formed by the injection molding of resin can be maintained.

Although, in the aforesaid embodiment, each of the cam gear 40d and the zoom gear 45a is formed along the along the entire circumference, the range where each of the gears 40d and 45a is formed may be changed suitably so long as the respective gears always mesh while the rotary cam tube 40 rotates. For example, each of the cam gear and the zoom gear may be provided three so as to have an interval of 120 degree along the circumferential direction.

Further, although, in the aforesaid embodiment, the three relay gears 55 are provided, the number of the relay gears 55 may be changed suitably, and the number of insertion holes 44b is also changed in accordance with the number of the relay gears.

Further, although, in the aforesaid embodiment, the tube 4 is formed by the injection molding of resin, the intensity of the supporting tube 44 can be maintained and so the invention is effective even in the case where the supporting tube 44 is formed by subjecting resin or metal etc. to the cutting process.

Further, although, in the aforesaid embodiment, the lens tube 25 according to the invention is applied to the projector 10, the invention is not limited thereto and may be applied to a film camera or a digital camera etc.

According to the lens body tube of the invention, since the zooming operation is performed by rotating the rotary cam tube via the relay gears in accordance with the rotation of the zooming tube the size of each of the insertion holes formed at the supporting tube as holes for the zooming operation can be made smaller as compared with the case where the rotary cam tube is rotated by a lever. Thus, the intensity of the supporting tube can be maintained despite that the zooming tube is disposed at the outside of the rotary cam tube. Further, the molding stability and the size accuracy of the supporting tube formed by the injection molding of resin can be maintained.

According to the projector of the invention, since the intensity and the size accuracy of the supporting tube can be maintained even when the supporting tube is disposed at the outside of the rotary cam tube in order to increase the zoom value, where by the zooming performance can be maintained.

The entire disclosure of each and every foreign patent application from which the benefit of foreign priority has been claimed in the present application is incorporated herein by reference, as if fully set forth.

What is claimed is:

1. A lens body tube comprising: a projection lens; and a rotary cam tube that moves a variable power lens within the projection lens in an optical axis direction in accordance with a rotation of the rotary cam tube, so as to perform a zooming operation in response to movement of the variable power lens in the optical axis direction, the lens body tube further comprising:

a supporting tube, provided at an outside of the rotary cam tube, that rotatably supports the rotary cam tube;

a zooming tube, rotatably provided at an outside of the supporting tube, that rotatably supports the supporting tube and rotates the rotary cam tube in accordance with a rotation of the zooming tube;

a cam gear provided at an outer peripheral surface of the rotary cam tube;

a zoom gear provided at an inner peripheral surface of the zooming tube;

a relay gear that is rotatably provided between the rotary cam tube and the zooming tube, and meshes with the cam gear and the zoom gear to transmit a rotation movement of the zooming tube to the rotary cam tube;

an insertion hole in which the relay gear is inserted so as to mesh the relay gear with the cam gear and the zoom gear, the insertion hole being formed at the supporting tube and; and a supporting portion, provided at the supporting tube, that rotatably supports the relay gear.

2. A lens body tube according to claim 1, wherein the relay gear has a rotary shaft acting as a rotation center, and the supporting portion is configured by a hearing recess portion that is formed so as to continue to the insertion hole and in which the rotary shaft is inserted.

3. A lens body tube according to claim 1, wherein the supporting tube is formed by injection molding of resin.

4. A projector comprising the lens body tube according to claim 1.

\* \* \* \* \*

UNITED STATES PATENT AND TRADEMARK OFFICE
CERTIFICATE OF CORRECTION

PATENT NO. : 7,486,453 B2  Page 1 of 1
APPLICATION NO. : 12/112515
DATED : February 3, 2009
INVENTOR(S) : Hitoshi Shimizu It is certified that error appears in the above-identified patent and that said Letters Patent is hereby corrected as shown below:

Title Page, Item 30 should read

--(30)   Foreign Application Priority Data

May 1, 2007     (JP)...............P2007-120474--.

Signed and Sealed this

Ninth Day of February, 2010

David J. Kappos
*Director of the United States Patent and Trademark Office*